Patented Sept. 2, 1952

2,609,330

UNITED STATES PATENT OFFICE 2,609,330

MEDIUM FOR PRODUCTION OF PENICILLIN

Alfred R. Stanley, Terre Haute, Ind., assignor to Commercial Solvents Corporation, Terre Haute, Ind., a corporation of Maryland No Drawing. Application April 10, 1948, Serial No. 20,373

10 Claims. (Cl. 195—100)

This invention relates to penicillin production and more particularly to a fermentation medium particularly useful for penicillin production.

It is well known that penicillin is produced in recoverable quantities by the growth of certain microorganisms, such as *Penicillium notatum* and *Penicillium chrysogenum*. The fermentation medium wherein penicillin-producing organisms are grown ordinarily comprises a liquid nutrient which has dissolved or suspended therein a fermentable carbohydrate and a suitable source of nitrogen. If desired, other materials may be added to the nutrient medium, such as certain mineral salts which may be required for the growth of the organism, or pH regulatory materials, such as calcium carbonate. In addition it is well recognized that the amount of active penicillin in the completely fermented beer may be increased by the addition of certain adjuvants, such as phenylacetamide, prior to or during the fermentation process.

In the commercial manufacture of penicillin by fermentation methods, the nutrient medium which is most generally employed at the present time is an aqueous medium containing lactose as the fermentable carbohydrate and the nitrogenous material contained in steep water as the source of nitrogen for the penicillin-producing organism. The use of steep water as a source of nitrogen has been found to be satisfactory. However, the art is still looking for other inexpensive sources of nitrogen for the penicillin-producing organism in order to promote growth and to increase the amount of penicillin produced during the fermentation process.

Recently it has been proposed that cottonseed meal or cottonseed flour may be employed in place of steep water to supply the nitrogen necessary for the full growth and development of penicillin-producing organisms. It has been further suggested in the art that when a nutrient medium for penicillin production is prepared by substituting cottonseed meal for steep water and when calcium carbonate is added to the medium, results are achieved which are at least equal to and sometimes superior to the results achieved when steep water is employed as the primary source of nitrogen. Pursuant to this suggestion recently made by prior investigators, experiments were carried out in which cottonseed meal and calcium carbonate were employed to replace the steep water in a fermentation medium. It was found that satisfactory yields of penicillin were produced when employing a nutrient medium of this character. However, unforeseen difficulties were encountered when an attempt was made to recover the penicillin present in the fermented nutrient medium. The difficulty encountered was in the primary filtration of the fermented medium in order to separate the beer from the solids including the mycelia of the fermenting organism. The presence of the cottonseed meal or flour in the fermentation liquid rendered the medium extremely difficult to filter or otherwise treat to separate a clear beer which must be subjected to further extraction processes for the recovery of penicillin therefrom. In view of this recovery difficulty, it was not considered that cottonseed meal could be used in a commercial process for the preparation of penicillin by fermentation even though the amount of penicillin in the fermented beer may be somewhat increased when compared with the amounts of penicillin produced when using steep water as the primary source of nitrogen in the nutrient medium.

Accordingly it is one object of this invention to provide a nutrient medium for penicillin production which may readily be separated from the mycelia of the organism after fermentation is complete whereby to permit of ready recovery of penicillin from the clear beer.

A further object of this invention is the provision of a nutrient medium for fermentation by penicillin-producing organisms which when used in a penicillin fermentation process gives rise to improved yields of penicillin.

A further object of this invention is the provision of a nutrient medium for penicillin-producing organisms which is low in cost and may be prepared from readily available materials.

A still further object of this invention is the provision of a process for the production of penicillin by fermentation wherein the yields of penicillin are increased and wherein the penicillin may be readily recovered from the fermented medium.

Further and additional objects will appear from the following description and the appended claims.

In accordance with this invention, it has been discovered that a very useful fermentation medium for penicillin production may be prepared which has as one ingredient a water-extracted residue of cottonseed meal (or flour) or soybean meal (or flour). These water-extracted residues are preferably incorporated into the fermentation medium in any desired amount along with a fermentable carbohydrate, such as lactose, Cerelose (a commercial form of glucose or dextrose produced by Corn Products Refining Company of Argo, Illinois), or a partially dextrinized starch. If desired, calcium carbonate may be added to the medium in order to control the pH of the fermenting medium and suitable adjuvants may be employed if desired. One satisfactory adjuvant which has been extensively employed in the art is phenylacetamide.

As previously indicated, serious recovery difficulties with respect to initial filtration are encountered when cottonseed meal or cottonseed flour is employed as such as the nitrogen source in a fermentation medium for penicillin production. For this reason, even though the amounts of penicillin produced during the fermentation process may be increased, such a medium could not be used commercially. In accordance with this invention, however, it has been discovered that the filtrability of the fermented medium may be markedly improved if the cottonseed meal or flour or the soybean meal or flour is first subjected to a water extraction step and if the resulting water-extracted residue is used to prepare the fermentation medium. When this is done the filtrability of the fermented material to separate the beer is markedly improved. In addition it has been discovered that the average yield of penicillin is increased when the water-extracted residue is employed in place of the meal or flour which has not been subjected to the water extraction procedure. While it might be expected that the water extract contains the substance that would promote growth and the formation of penicillin in the fermented medium, such was not found to be the case, and greatly superior results are obtained when the residue is employed in the medium as compared to when the water extract itself is employed in the medium. In order to demonstrate the findings in this respect and to demonstrate the unexpected advantages obtained in practicing this invention as outlined above, the following experiment was carried out, the results being shown in Table I.

A commercial cottonseed flour intended for human consumption and sold under the trade name "Proflo" was selected. This material is one from which the cottonseed oil had previously been extracted by heat and pressure and it is sold by Traders Oil Mill Company of Fort Worth, Texas. In order to remove the water soluble fraction of this cottonseed flour for these particular experiments, the following method was employed: 300 grams of Proflo were weighed into a 6 liter Erlenmeyer flask. Four liters of tap water were added, mixed thoroughly and the mixture was autoclaved at 120° C. for two hours. The solids were allowed to settle out and the mother liquor was then filtered through No. 615 paper on a Buchner funnel, precaution being taken to decant the liquid first. Filtration was satisfactory by this method but had a tendency to be poor if the solids were resuspended in the mother liquor prior to filtration.

As indicated in Table I a series of five fermenters were set up. To each fermenter was added 200 grams of lactose, 100 grams of calcium carbonate and 3 grams of phenylacetamide as an adjuvant. To each of fermenters No. 1 and No. 3 was added the filtrate obtained from the water extraction of 300 grams of Proflo prepared as outlined above. To each of fermenters No. 2 and No. 4 were added the water-extracted residues of Proflo left on the No. 615 paper as above indicated. To fermenter No. 5 was added 300 grams of untreated Proflo. Each fermenter was then made up to ten liters with water and it will be noted that the nutrient medium in each fermenter was the same except with respect to the Proflo fraction employed. After sterilization of the medium the fermenters were each inoculated with a strain of Penicillium designated as New Wisconsin Q-176 which had previously been propagated for 24 hours in a bran medium. The five fermenters were incubated under the same conditions at about 24° C. and air was passed through the fermenters at the rate of one volume/volume/minute. Agitation of each fermenter was effected with turbine blades revolving at 400 R. P. M. The fermenters were assayed periodically for penicillin. The results of this experiment are clearly indicated in Table I.

*Table I*

| Fermenter No. | Medium | | Assays, u./ml. | | | | | |
|---|---|---|---|---|---|---|---|---|
| | Proflo | Proflo Fraction | 3 days | | 4 days | | 5 days | |
| | | | am | pm | am | pm | am | pm |
| | g. | | | | | | | |
| 1 | | Filtrate of 300 g | 52 | 61 | 87 | 93 | 104 | 119 |
| 2 | | Insoluble of 300 g | 165 | 274 | 455 | 440 | 580 | 551 |
| 3 | | Filtrate of 300 g | 35 | 49 | 81 | 96 | 120 | 109 |
| 4 | | Insoluble of 300 g | 256 | 403 | 519 | 689 | 720 | 630 |
| 5 | 300 | | 100 | 126 | 244 | 282 | 436 | 494 |

It will be noted that fermenters No. 2 and No. 4 show considerably higher assays of penicillin expressed as units per milliliter than the assays of fermenters No. 1 and No. 3, thus clearly demonstrating that the water-extracted residue of cottonseed meal is considerably more active in stimulating the formation of penicillin in the fermentation medium than the water soluble portion. This is the inverse of what might be expected. It will be further noted in connection with the assay analyses given in Table I that at the five day fermentation period, both in the morning (a. m.) and afternoon (p. m.) the penicillin yield was significantly higher in fermenters No. 2 and No. 4 than in No. 5. This is important because in commercial practice fermenters are run for a period of four days. In addition, after fermentation was completed, the fermentation liquid from fermenter No. 5 was difficult to filter in order to separate the beer from the mycelia of the micro-organism. This difficulty was not experienced in fermenters No. 2 and No. 4, thus demonstrating further improved results that are obtained when employing the water-extracted residue of the cottonseed flour.

The foregoing data clearly shows the improved results that are obtained when employing the water-extracted residue of cottonseed flour in accordance with one embodiment of this invention.

In order to demonstrate the improved results obtainable by using water-extracted residues of cottonseed flour and soybean meal as compared with the whole flour or meal in accordance with this invention, a series of fermenters were set up, each of which was prepared, inoculated and incubated in the manner outlined in the previous experiment, with the exceptions noted in Table II, to which reference is here made.

nection with the preceding experiments. The concentrations of the several ingredients in the medium are not critical, however, but should be maintained within the ranges will recognized in the art for the preparation of a fermentation medium for penicillin production.

*Table II*

| Fermenter No. | Medium | | | | Agitation | | Assays, u./ml. | | | | | | | |
|---|---|---|---|---|---|---|---|---|---|---|---|---|---|---|
| | Soybean | | Proflo | | Type | Speed R. P. M. | 3 days | | 4 days | | 5 days | | 6 days | |
| | Meal | Insoluble | Flour | Insoluble | | | am | pm | am | pm | am | pm | am | pm |
| | *Percent* | | *Percent* | | | | | | | | | | | |
| 1 | 3 | | | | Turbine | 400 | 91 | 99 | 136 | 140 | 364 | 250 | 365 | 415 |
| 2 | 3 | | | | do | 400 | 118 | 109 | 162 | 173 | 276 | 297 | 318 | 356 |
| 3 | | of 3% | | | do | 400 | 448 | 486 | 522 | (1) | (1) | (1) | (1) | (1) |
| 4 | | | 3 | | Small Paddles | 300 | 309 | 366 | 436 | 594 | | 666 | 624 | 363 |
| 5 | | | 3 | | do | 300 | 140 | 198 | 252 | 282 | 519 | 446 | 557 | 692 |
| 6 | | | | of 3% | do | 300 | 449 | 535 | 613 | 705 | | 850 | 777 | 836 |
| 7 | | | | of 3% | do | 300 | 850 | 975 | 863 | 803 | | | | |

[1] Foamed over.

As indicated in this table, there were seven fermenters set up. Each fermenter contained 10 liters of medium and had dissolved or suspended therein 2 per cent lactose, 1 per cent calcium carbonate and 0.03 per cent phenylacetamide. Fermenters No. 1 and No. 2 contained 3 per cent of solvent-extracted substantially oil-free soybean meal from a commercial source and fermenter No. 3 contained a water-extracted residue of the soybean meal. The water-extracted residue was prepared as previously indicated in connection with Proflo. Fermenters No. 4 and No. 5 contained 3 per cent whole Proflo flour and fermenters No. 6 and No. 7 contained the water-extracted residue prepared as indicated above. The several agitation speeds are indicated in the table together with assays in units per milliliter taken in the morning and afternoon on the third to sixth days.

As before, the significant figures in Table II are the results of the assays at the four-day period since this is the time that the commercial fermenters are run. It will be noted that at this time the figures for the medium prepared from water-extracted Proflo (Nos. 6 and 7) are consistently higher than those prepared from the unextracted flour (Nos. 4 and 5). The table clearly indicates that improved results are obtained when employing the water insoluble fraction instead of the whole flour. In addition the fermented medium containing the water insoluble fraction was much more readily filtered in order to separate the mycelia from the beer.

With reference to fermenters No. 1 through No. 3 containing the soybean material, it will be noted that the results clearly show that the medium prepared from water-extracted soybean meal has a higher assay than that prepared from whole soybean meal which had not been water-extracted.

The foregoing experiments summarized in Tables I and II clearly demonstrate that it is possible to improve penicillin yields by employing a fermentation medium containing the water-extracted residue of cottonseed flour or soybean meal. In commercial practice these substances may be employed in whole or in part to replace the steep water which has been used in commercial fermentation processes. A suitable fermentation medium for use on a commercial scale preferably contains the water-extracted residue, lactose, calcium carbonate and phenylacetamide in the proportions indicated in connection with the preceding experiments. The concentrations of the several ingredients in the medium are not critical, however, but should be maintained within the ranges will recognized in the art for the preparation of a fermentation medium for penicillin production.

It will, of course, be understood that either cottonseed meal or cottonseed flour may be used for preparing the fermentation medium and likewise either soybean meal or soybean flour may similarly be used. The term "meal" as employed in the accompanying claims is intended to also include flour. An important consideration is that the meal or flour be previously subjected to a water-extraction treatment before incorporation into the fermentation medium.

It is preferred to employ a cottonseed meal or a cottonseed flour from which the natural oil has been removed by solvent extraction or by heat and pressure treatment. Likewise if soybean meal or flour is employed, it is preferred to remove the oil so that the meal is substantially oil-free. This is desired, particularly because of economic considerations and also because the oil may have an adverse effect upon the ultimate recovery of crystalline penicillin from the fermentation beer.

In preparing the fermentation medium, this is carried out by any of the methods that are well known in the art and prior to fermentation the medium is preferably sterilized in accordance with the practice well known to those skilled in the art. Likewise the inoculation of the commercial fermenter is a well known procedure which does not form a part of this invention. While lactose is the preferred fermentable carbohydrate for use in connection with the medium of this invention, other fermentable carbohydrates, of course, may be employed either alone or in combination with the lactose. Suitable fermentable carbohydrates that may be used in connection with penicillin-producing strains of organisms are glucose and partially dextrinized starch. The calcium carbonate employed in the medium is for the purpose of controlling the acidity of the fermenting medium.

The phenylacetamide of the medium functions primarily as an adjuvant to increase the amount of penicillin formed without actually materially affecting the growth of the organism. The function of these adjuvants is not clearly understood but it is believed that they are directly involved in the chemical reactions which take place during the synthesis of the penicillin by the organism. While phenylacetamide is preferred, other adjuvants may be employed, such as 2-phenylethylamine, p-hydroxy phenylethylamine, phenylacetic acid, phenylethylamine hydrochloride, p-hydroxyacetamide, phenoxyacetic acid, p-chlorophenylacetic acid, p-bromo- and p-iodophenylacetic acid, etc.

After the fermentation has been effected by the organism in the medium of this invention, the penicillin may be recovered by any of the methods that are well known in the art. It has been found that the medium of this invention does not adversely affect the commercial recovery of crystalline penicillin.

While several particular embodiments of this invention are shown above, it will be understood, of course, that the invention is not to be limited thereto, since many modifications may be made, and it is contemplated, therefore, by the appended claims, to cover any such modifications as fall within the true spirit and scope of this invention.

What is claimed is:

1. A fermentation medium for penicillin production comprising water, an assimilable carbohydrate, and the water-insoluble residue remaining after water extraction of a member selected from the group consisting of cottonseed meal and soybean meal.

2. A fermentation medium for penicillin production comprising water, an assimilable carbohydrate, an adjuvant selected from the group consisting of phenylacetamide, 2-phenylethylamine, p-hydroxyphenylethylamine, phenylacetic acid, phenylethylamine hydrochloride, p-hydroxyacetamide, phenoxyacetic acid, p-chlorophenylacetic acid, p-bromophenylacetic acid, and p-iodophenylacetic acid, and the water-insoluble residue remaining after water extraction of a member selected from the group consisting of cottonseed meal and soybean meal.

3. A fermentation medium for penicillin production comprising water, lactose, calcium carbonate, phenylacetamide and a water-insoluble residue of water-extracted cottonseed meal.

4. A fermentation medium for penicillin production comprising water, a carbohydrate assimilable by a penicillin producing organism, and a substantially oil-free, water-insoluble residue from water-extracted cottonseed meal.

5. A fermentation medium for penicillin production comprising water, an assimilable carbohydrate, and the water-insoluble residue remaining after water-extraction at about 120° C. of a member selected from the group consisting of cottonseed meal and soybean meal.

6. A method for the production of penicillin which comprises fermenting with a penicillin-producing microorganism a nutrient medium comprising water, an assimilable carbohydrate, and the water-insoluble residue remaining after water-extraction at about 120° C. of a member selected from the group consisting of cottonseed meal and soybean meal.

7. In a method for the production of penicillin by fermentation of a nutrient medium with a penicillin-producing microorganism, the improvement which consists of carrying out said fermentation in a nutrient medium containing as an essential ingredient the water-insoluble residue from water-extraction of a meal selected from the group consisting of cottonseed meal and soybean meal.

8. A method for the production of penicillin which comprises fermenting with a penicillin-producing microorganism a nutrient medium comprising water, an assimilable carbohydrate and a water-insoluble residue from water-extraction of a meal selected from the group consisting of cottonseed meal and soybean meal.

9. The method recited in claim 8 wherein said meal is cottonseed meal.

10. A method for the production of penicillin which comprises fermenting with a penicillin-producing microorganism a nutrient medium comprising water, lactose, calcium carbonate, phenylacetamide, and a substantially oil free, water-insoluble residue of water-extracted cottonseed meal.

ALFRED R. STANLEY.

REFERENCES CITED

The following references are of record in the file of this patent:

UNITED STATES PATENTS

| Number | Name | Date |
| --- | --- | --- |
| 2,051,017 | Schwarz | Aug. 11, 1936 |
| 2,437,918 | McCormack | Mar. 16, 1948 |
| 2,448,790 | Foster et al. | Sept. 7, 1948 |
| 2,448,791 | Foster et al. | Sept. 7, 1948 |
| 2,476,107 | Moyer | July 12, 1949 |

OTHER REFERENCES

Watts et al., Ind. and Eng. Chem. Oct. 1939, page 1282.

Foster et al., Jr. Bacteriology, vol. 51, No. 4, April 1946, pages 474–476.

Woodruff et al., "A Study of Protein Extract from Soybeans," Jr. Agri. Research, vol. 57, Nov. 15, 1938, pages 737, 738 and 743.